United States Patent
Montacie

[15] 3,682,288
[45] Aug. 8, 1972

[54] SELF-LOADING CONVEYOR
[72] Inventor: Marcel Montacie, 46 rue Remy Dumoncel, Paris 14e, France
[22] Filed: Sept. 2, 1970
[21] Appl. No.: 69,018

[30] Foreign Application Priority Data
Sept. 3, 1969 France.....................6930050

[52] U.S. Cl......................................198/7, 198/174
[51] Int. Cl. ..............................................B65b 65/02
[58] Field of Search........198/10, 213, 7, 14, 204, 36; 214/10

[56] References Cited
UNITED STATES PATENTS
3,189,168   6/1965   Coats........................198/213

FOREIGN PATENTS OR APPLICATIONS
1,266,217   12/1965   Germany...................198/174

*Primary Examiner*—Richard E. Aegerter
*Attorney*—Sughrue, Rothwell, Mion, Zinn & Macpeak

[57] ABSTRACT

A self-loading conveyor for the removal of excavated material from a cavity produced by a boring or winning machine, comprising an inclined channel and material removing scrapers driven by an endless chain and adapted to travel in the channel. A collecting foot for the excavated material is disposed at the lower end of the channel and is provided with a protective cover. A driving head is disposed at the upper end of the channel to drive the endless chain. The collecting foot has lateral apertures and is reciprocable in a direction parallel to the wall of the cavity from which the excavated material is to be removed, thereby effecting the collecting of the excavated material through the lateral apertures on each side of the foot.

8 Claims, 6 Drawing Figures

PATENTED AUG 8 1972

SELF-LOADING CONVEYOR

BACKGROUND OF THE INVENTION

The present invention relates to a shaker conveyor for the collecting of excavated material produced by a continuous winning or boring operation and concerns, more particularly, the association with the usual translational movement for removing excavated material by means of such a conveyor, of a reciprocating collecting movement, the direction of which is perpendicular to the translational movement and parallel to the surface on which the excavated material rests, thus effecting self-loading through the lateral apertures of the lower end of the foot of the conveyor.

It is known in fact that in an excavating machine operating continuously it is necessary to provide permanent removal of the excavated material produced during its operation.

Thus, a boring machine is provided with buckets mounted on the rotating tool-carrying plate, collecting the waste material and pouring it into a conveyor advantageously situated axially of the machine or at its upper portion.

However, the presence of these buckets is a source of difficulties in workings where it is difficult to follow the collecting of excavated material in the floor position by discharging them towards the conveyor in their upper position.

Furthermore, the existence of these buckets limits the speed of the rotary plate to that from which the excavated material no longer falls back, that is to say the speed in excess of which the centrifugal force which is applied to the excavated material becomes greater than the gravitational force which normally makes them fall.

SUMMARY OF THE INVENTION

The conveyor according to the present invention eliminates the above-described difficulties and restrictions of prior art machines. It is formed of an inclined surface over which scrapers attached at regular intervals to an endless chain effect the removal of the excavated material. The lower end of the inclined surface comprises a collecting foot which oscillates parallel to the surface of the floor of the tunnel or gallery, in a direction substantially perpendicular to the axis of the hole excavated, and the excavated material passes alternately through the lateral apertures formed at each side of the foot to load the conveyor automatically and, once transported to the upper end of the conveyor, falls into a hopper through an opening provided for this purpose between the upper end of the inclined surface and the driving head of the conveyor.

A self-loading shaker conveyor according to the present invention, for the removal more particularly of excavated material produced by a winning or boring operation, constituted by an inclined channel in which scrapers driven by an endless chain are adapted to travel for removing the excavated material, the inclined channel comprising at its lower end a collecting foot for the excavated material which is provided with a protective cover, and at its upper end, a driving head, is characterized in that the foot is given a sweeping reciprocating movement parallel to the wall of the cavity to be cleared, thus effecting the collecting of the excavated material through lateral apertures formed for this purpose in the foot.

BRIEF DESCRIPTION OF THE DRAWINGS

The objects and advantages of the present invention, applied to a continuous boring machine, will become apparent from the following description associated with the drawings wherein.

DESCRIPTION OF THE PREFERRED EMBODIMENT

Figure 1:
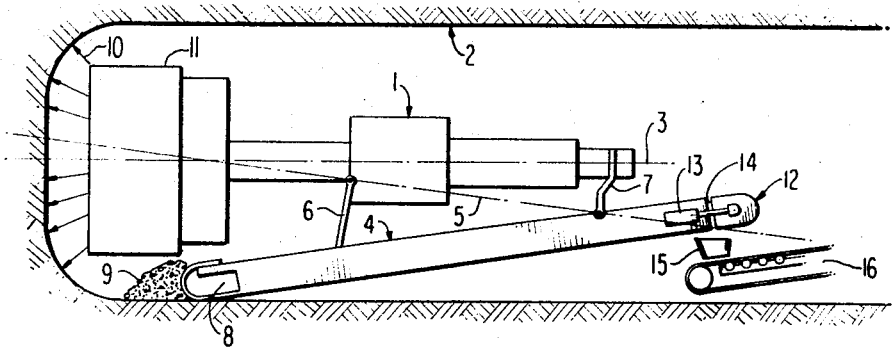
FIG. 1 shows a longitudinal section through a boring machine equipped with a conveyor according to the invention and excavating a straight tunnel of circular cross-section.

In FIG. 1, 1 is a machine for the continuous boring of a tunnel 2 of circular cross-section on the axis 3, the machine being provided with a conveyor 4 carrying out a shaking movement about an axis 5 defined by articulations co-operating with the machine 1, the connection between the said machine 1 and the conveyor 4 being effected by fixing parts 6 and 7 supporting the articulations. The conveyor 4 comprises at one of its ends a collecting foot 8 for the excavated material 9 produced by the tools represented by the arrowed lines 10 and mounted on the rotary plate 11, while at the other end a driving head 12 operates the conveyor 4 to which it is fixed by means of jacks 13, thereby subjecting the chain of the conveyor to the desired tractive force. Between the head 12 and the body of the conveyor 4 there is arranged a gap 14 through which the excavated materials, guided by the hopper 15, fall on to a conventional conveyor 16 which discharges them towards the entrance of the tunnel 2.

Figure 2:
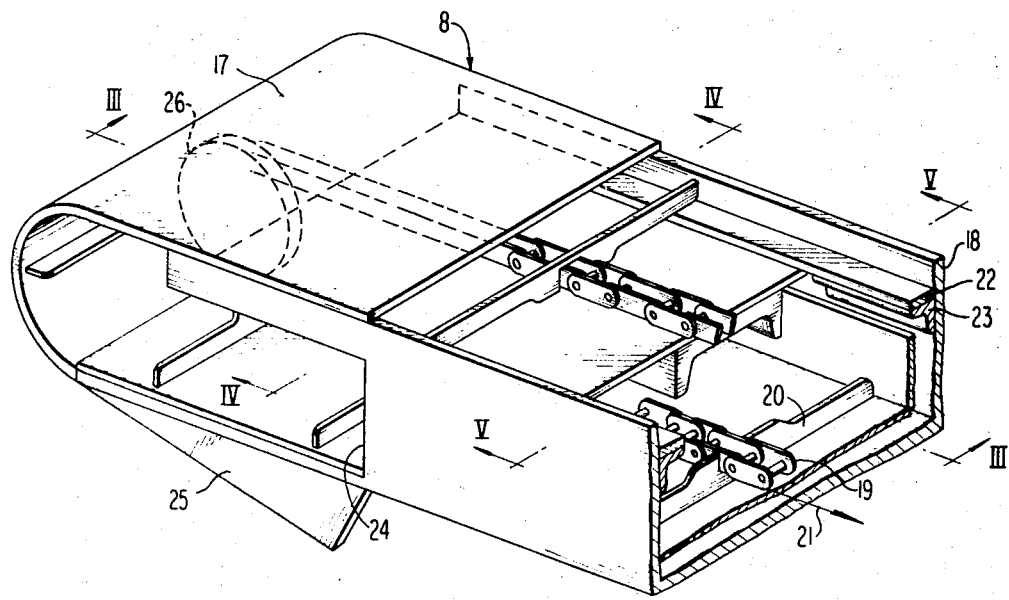
FIG. 2 shows in perspective, partly in section, the collecting foot of the shaker conveyor.
Figure 3:
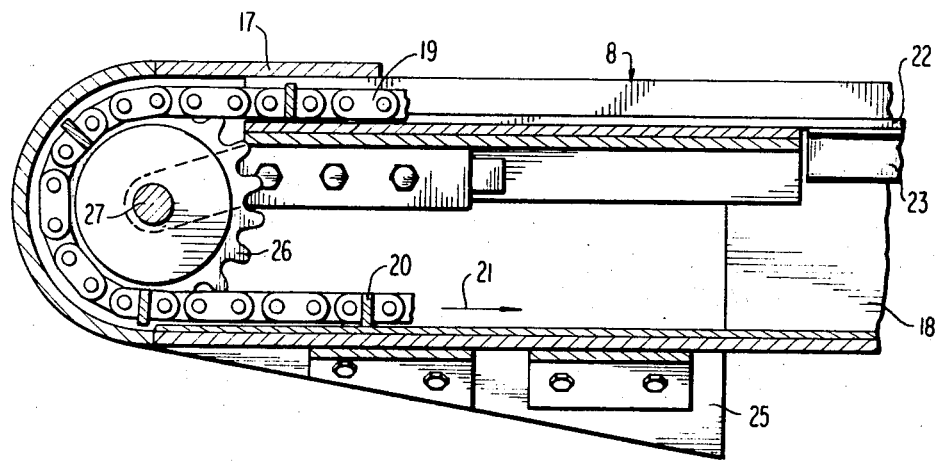
FIG. 3 is a partial longitudinal section through the foot, taken on III—III of FIG. 2.
Figure 4:
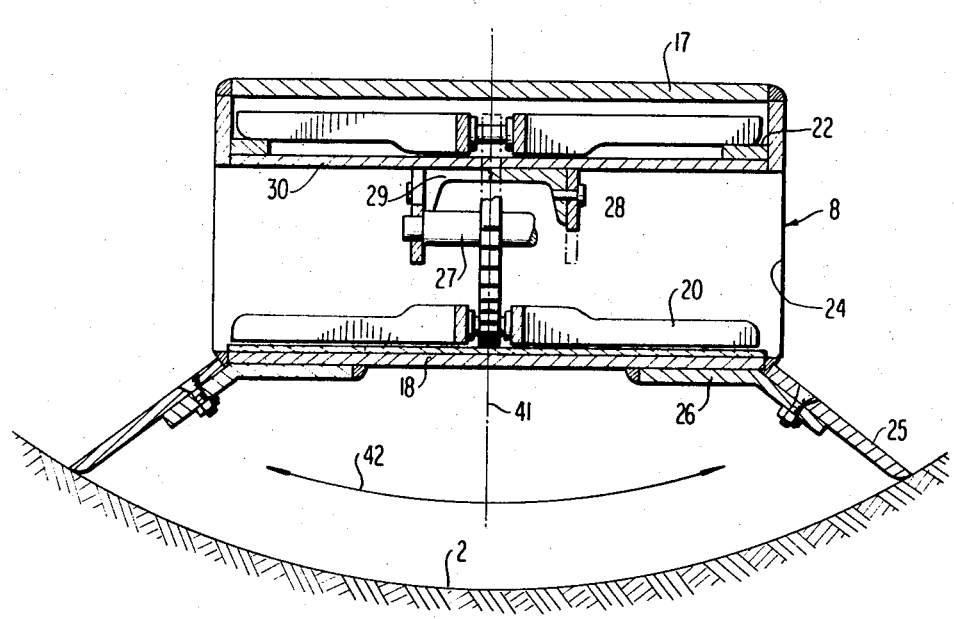
FIG. 4 shows a cross-section of the foot taken on line IV—IV of FIG. 2.

FIGS. 2, 3 and 4 show the details of the structure of the collecting foot 8 which is covered by a cover 17 and arranged at the lower end of the U-shaped channel constituting the body of the conveyor 4, in the bottom of which the chain 19 travels which is provided with scrapers 20 entraining the excavated material upwards in the direction indicated by the arrow 21. In the return run, the scrapers 20 slide over flat plates 22 mounted on angle members 23 fixed to the lateral walls of the channel 18. Lateral apertures 24 are provided at the lower end of the channel 18 to form the collecting foot 8.

The conveyor being inclined along the excavated tunnel, two beveled metal plate elements 25 are fixed by means of angle members 43 to the corners of the U of the channel and at the lower end thereof so as to scrape the floor on which the excavated material rests, and to serve as a deflector for the excavated material.

A lower toothed wheel 26 serves to return the chain 19, and its shaft 27 rotates between two supports 28 forming bearings and screwed to each side of a section member 29 fixed axially of the channel 18 and closing the latter at the level of the foot 8.

Figure 5:
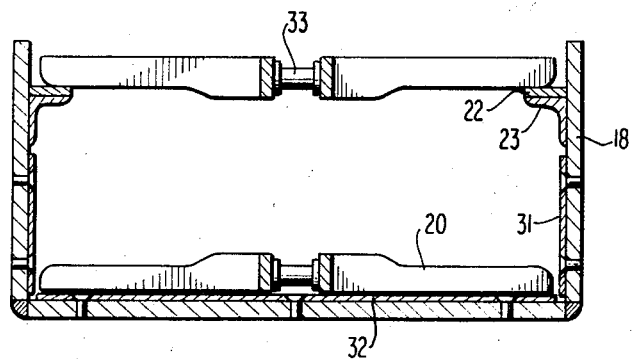
FIG. 5 shows a cross-section through the conveyor taken on line V—V of FIG. 2.

In FIG. 5, the channel 18 is covered internally with manganese plates 31 and 32, or plates of another suitable material, arranged at the places against which the excavated material will rub, in order to prevent premature wear. The scrapers 20 are made of two identical parts connected by a bar 33 forming a driving pin integral with the chain 19.

Figure 6:
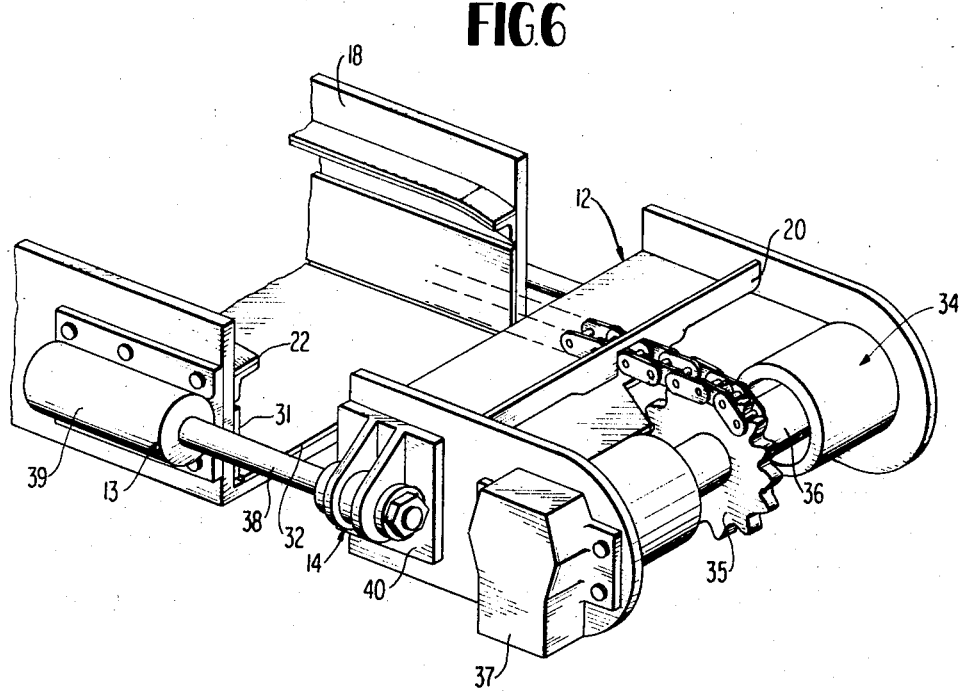
FIG. 6 shows a perspective view of the driving head.

In FIG. 6, the structure 34, shown with the cover removed, serves as a support for the driving toothed wheel 35 of the chain 19, the wheel 35 being carried by the shaft 36 which is driven at the desired speed by two speed reduction gear units 37 driven by motors (not shown) and also serving as a bearing for the shaft 36, being arranged on either side of the support 34. The supports 34 are fixed by means of parts 40 to the end of the two rods 38 of jacks 13 only one of which is shown, and whose cylinders 39 are fixed on the lateral walls of the channel 18. By regulating the fluid pressure in the cylinders 39 by means of a hydraulic accumulator (not shown) the desired permanent tension for the chain 19 is ensured, while the gap 14 between the channel 18 and the driving head 12 is kept at a substantially constant value.

In operation, the conveyor is suspended, below the machine from which it has to remove the excavated material, by articulations arranged substantially in the plane of symmetry of the machine. The oscillation axis 5 of the conveyor intersects the axis 3 of the tunnel vertically of the oscillatory collecting foot 8, whose plane of symmetry 41 (FIG. 4) coincides in the condition of rest with the vertical plane of symmetry of the tunnel, whereas during operation an appropriate device moves the conveyor to both sides of the plane of symmetry 41 with an amplitude of oscillation symbolized by the arrowed arc 42 (FIG. 4), while the foot 8 of the conveyor 4 sweeps all the lower zone of the tunnel 2, where the excavated material is lying. The excavated material, alternately scraped by the metal plates 25 situated on either side of the foot 8 and acting as deflectors, enters through the lateral apertures 24 in the foot 8 where it is entrained by the lower scrapers 20 mounted on the chain 19 upwards in the channel 18, at the upper end of which they are poured into the gap 14 between the channel 18 and the driving head 12 to be discharged towards the outside by known means. To prevent any problems in connection with the falling of the excavated material, it is appropriate to make the axes of oscillation 5 pass through the lower end of the gap 14, since, the latter remaining substantially fixed during oscillations, there is no dispersion of excavated material, such material always being discharged at one and the same point in space. It will also be noted that it is advantageous to arrange the rear articulation, that secured to the part 7, at the level of the upper portion of the channel 18 of the conveyor so as to limit to a minimum the amplitudes of the said conveyor, at the height of the rear portion of the machine which is generally rather encumbered, so that it is not possible to accept anything more than limited displacements for the mobile parts.

Of course, some means may be replaced by any equivalent means, since it should be stated that the invention is not limited to the particular form of embodiment which has just been described, but that it comprises all possible variants which come within the general definition which has been given.

Thus, in a machine, for example, for the continuous winning of minerals, with which the cavity when excavated has a flat floor on which the excavated material falls, the movement of the collecting foot of the conveyor to be adapted thereto will oscillate in a plane instead of the rocking movement as described hereinbefore, which is appropriate only for a tunnel having a circular end. This movement is obtained by rotating the conveyor about a vertical axis advantageously arranged level with the gap in the channel serving for the discharge of the excavated material.

I claim:

1. Self-loading shaker conveyor for the removal of excavated material from a cavity produced by a boring or winning machine, comprising an inclined channel, material-removing scrapers driven by an endless chain and adapted to travel in said channel, a collecting foot for the excavated material disposed at the lower end of said channel and provided with a protective cover, means to drive said chain, said collecting foot having lateral apertures and being reciprocable in a direction substantially transverse to the direction of travel of said chain, and means to reciprocate said foot in said substantially transverse direction, thereby effecting the collecting of the excavated material through said lateral apertures arranged at each side of said foot.

2. Self-loading conveyor according to claim 1, wherein below said lateral apertures, there are positioned on said foot obliquely inclined plates in contact with the ground.

3. Self-loading conveyor according to claim 1, for a tunnel-boring machine adapted to form a tunnel of circular cross section, wherein said reciprocating means is adapted to reciprocate said foot in an oscillatory rocking movement along an arc of a circle.

4. Self-loading conveyor according to claim 3, wherein the axis of said foot movement is positioned to intersect the longitudinal axis of the boring machine at a point substantially in vertical alignment with the collecting foot.

5. Self-loading conveyor according to claim 4, wherein said channel has a discharge opening, and said axis of said foot movement passes through said discharge opening.

6. Self-loading conveyor according to claim 5, characterized in that the rear articulation of said axis of said foot movement is arranged at the level of the top of the cross-section of the conveyor channel.

7. Self-loading conveyor according to claim 1, for a winning machine adapted to excavate a tunnel having a flat floor, wherein said channel has a discharge gap, and said reciprocating means is adapted to reciprocate said foot by rotation thereof about a vertical axis arranged level with said gap in the channel serving for the discharge of the excavated material.

8. Self-loading conveyor according to claim 1, wherein said means to drive said chain is a driving head disposed at the upper end of said channel.

* * * * *